United States Patent
Fan et al.

(10) Patent No.: US 9,037,452 B2
(45) Date of Patent: May 19, 2015

(54) RELATION TOPIC CONSTRUCTION AND ITS APPLICATION IN SEMANTIC RELATION EXTRACTION

(75) Inventors: James J. Fan, Mountain Lakes, NJ (US); David Gondek, Brooklyn, NY (US); Aditya A. Kalyanpur, Westwood, NJ (US); Chang Wang, Elmsford, NY (US)

(73) Assignee: AFRL/RIJ, Rome, NY (US)

( * ) Notice: Subject to any disclaimer, the term of this patent is extended or adjusted under 35 U.S.C. 154(b) by 517 days.

(21) Appl. No.: 13/421,908

(22) Filed: Mar. 16, 2012

(65) Prior Publication Data
US 2013/0246046 A1 Sep. 19, 2013

(51) Int. Cl.
*G06F 17/27* (2006.01)

(52) U.S. Cl.
CPC .................. *G06F 17/2785* (2013.01)

(58) Field of Classification Search
CPC .................. G06F 17/27; G06F 17/28
See application file for complete search history.

(56) References Cited

U.S. PATENT DOCUMENTS

| | | | |
|---|---|---|---|
| 7,383,169 B1 * | 6/2008 | Vanderwende et al. | 704/9 |
| 7,689,411 B2 * | 3/2010 | Sandor et al. | 704/9 |
| 7,899,666 B2 * | 3/2011 | Varone | 704/9 |
| 8,015,140 B2 * | 9/2011 | Kumar et al. | 706/46 |
| 8,458,115 B2 * | 6/2013 | Cai et al. | 706/52 |
| 8,630,975 B1 * | 1/2014 | Guo et al. | 707/608 |
| 8,666,730 B2 * | 3/2014 | Todhunter et al. | 704/9 |
| 2002/0087309 A1 * | 7/2002 | Lee et al. | 704/240 |
| 2005/0071150 A1 * | 3/2005 | Nasypny | 704/9 |
| 2006/0217818 A1 * | 9/2006 | Fujiwara | 700/16 |
| 2009/0019032 A1 * | 1/2009 | Bundschus et al. | 707/5 |
| 2009/0192954 A1 * | 7/2009 | Katukuri et al. | 706/11 |
| 2012/0179682 A1 * | 7/2012 | De Saeger et al. | 707/737 |
| 2012/0209625 A1 * | 8/2012 | Armstrong et al. | 705/3 |
| 2012/0259855 A1 * | 10/2012 | Mizuguchi et al. | 707/739 |
| 2012/0330976 A1 * | 12/2012 | Tsuchida et al. | 707/749 |
| 2013/0282727 A1 * | 10/2013 | Muraoka et al. | 707/740 |

OTHER PUBLICATIONS

Ocampo-Guzman, Isidra, Ivan Lopez-Arevalo, and Victor Sosa-Sosa. "Data-driven approach for ontology learning." Electrical Engineering, Computing Science and Automatic Control, CCE, 2009 6th International Conference on. IEEE, 2009.*

Gulla, Jon Atle, and Terje Brasethvik. "A Hybrid Approach to Ontology Relationship Learning." Natural Language and Information Systems. Springer Berlin Heidelberg, 2008. 79-90.*

Lin, Dekang, and Patrick Pantel. "Discovery of inference rules for question-answering." Natural Language Engineering 7.04 (2001): 343-360.*

Bundschus, Markus, Volker Tresp, and Hans-Peter Kriegel. "Topic models for semantically annotated document collections." NIPS workshop: Applications for Topic Models: Text and Beyond. 2009.*

(Continued)

*Primary Examiner* — Brian Albertalli

(74) *Attorney, Agent, or Firm* — Gibb & Riley, LLC

(57) ABSTRACT

Systems and method automatically collect training data from manually created semantic relations, automatically extract rules from the training data to produce extracted rules, and automatically characterize existing semantic relations in the training data based on co-occurrence of the extracted rules in the existing semantic relations. Such systems and methods automatically construct semantic relation topics based on the characterization of the existing semantic relations, and group instances of the training data into the semantic relation topics to detect new semantic relations.

24 Claims, 12 Drawing Sheets

(56) References Cited

OTHER PUBLICATIONS

Pantel, Patrick, and Marco Pennacchiotti. "Espresso: Leveraging generic patterns for automatically harvesting semantic relations." Proceedings of the 21st International Conference on Computational Linguistics and the 44th annual meeting of the Association for Computational Linguistics. Association for Computational Linguistics, 2006.*

Yao, Limin, et al. "Structured relation discovery using generative models." Proceedings of the Conference on Empirical Methods in Natural Language Processing. Association for Computational Linguistics, 2011.*

Oren Etzioni, Michael Cafarella, Doug Downey, Ana-Maria Popescu, Tal Shaked, Stephen Soderland, Daniel S.Weld, and Alexander Yates. 2005. Unsupervised named-entity extraction from the web: An experimental study. Artificial Intelligence,165:91"C134, Nov. 1, 2004, pp. 1-44.

S. Deerwester, S. T. Dumais, G. W. Furnas, T. K. Landauer, and R. Harshman. 1990. Indexing by latent semantic analysis. Journal of the American Society for Information Science, 41(6):391"C407., pp. 1-34.

D. Blei, A. Ng, and M. Jordan. 2003. Latent Dirichlet allocation. Journal of Machine Learning Research, 3:993"C1022, pp. 1-30.

http://projects.ldc.upenn.edu/ace, LDC Projects ACE, Automatic Content Extraction, Mar. 15, 2012, pp. 1-2.

* cited by examiner $\{[\phi_j]_{\phi_0}\} = DWT(T, \varepsilon, J)$
//INPUT:
//$T$: The input matrix.
//$\varepsilon$: Desired precision, which can be set to a small number or simply machine precision.
//$J$: Number of levels (optional).
//OUTPUT:
//$[\phi_j]_{\phi_0}$: extended diffusion scaling functions at scale $j$.

$\phi_0 = I$;
For $j = 0$ to $J - 1$ {
$\quad ([\phi_{j+1}]_{\phi_j}, [T^{2^j}]_{\phi_j}^{\phi_{j+1}}) \leftarrow QR([T^{2^j}]_{\phi_j}, \varepsilon)$;
$\quad [\phi_{j+1}]_{\phi_0} = [\phi_{j+1}]_{\phi_j} [\phi_j]_{\phi_0}$;
$\quad [T^{2^{j+1}}]_{\phi_{j+1}} = ([T^{2^j}]_{\phi_j}^{\phi_{j+1}} [\phi_{j+1}]_{\phi_j})^2$;
}

RELATION TOPIC CONSTRUCTION AND ITS APPLICATION IN SEMANTIC RELATION EXTRACTION

This invention was made with Government support under Contract No.: FA8750-09-C-0172 awarded by Defense Advanced Research Projects Agency (DARPA). The Government has certain rights in this invention.

BACKGROUND

The present disclosure relates to systems and methods that use semantic relations within text, and more specifically, to systems and methods that automatically detect semantic relations in textural material.

Detecting semantic relations in text is very useful in both information retrieval and question answering because it enables knowledge bases to be leveraged to score passages and retrieve candidate answers. To extract semantic relations from text, three types of approaches have been applied. Rule-based methods employ a number of linguistic rules to capture relation patterns. Feature based methods transform relation instances into a large amount of linguistic features like lexical, syntactic and semantic features, and capture the similarity between these feature vectors. Recent results mainly rely on kernel-based approaches. Many of them focus on using tree kernels to learn parse tree structure related features. Other researchers study how different approaches can be combined to improve the extraction performance. For example, by combining tree kernels and convolution string kernels, achieved the state of the art performance on ACE, which is a benchmark dataset for relation extraction.

SUMMARY

Exemplary methods herein automatically collect training data from manually created semantic relations, automatically extract rules from the training data to produce extracted rules, and automatically characterize existing semantic relations in the training data based on co-occurrence of the extracted rules in the existing semantic relations using a computerized device. Such methods automatically construct semantic relation topics based on the characterization of the existing semantic relations, and group instances of the training data into the semantic relation topics to detect new semantic relations using the computerized device.

These methods can remove redundant ones of the semantic relation topics using the computerized device. Further, the semantic relation topics each can comprise different concept levels. The process of characterizing the existing semantic relations in the training data is based on the number of extracted rules that are shared between corresponding ones of the existing semantic relations. Each of the rules defines relationships between two logical arguments, and each of the rules has components comprising $argument_1$ type, $argument_2$ type, noun, preposition and verb.

Additionally, such exemplary methods can automatically remove noisy data from the semantic relation repository using the computerized device in a process that automatically extracts popular argument types and keywords for each semantic relation. The "popular" argument types and keywords are those that occur above a previously established occurrence level in the training data. Such methods also automatically remove noisy data from the semantic relation repository by automatically combining the popular argument types and keywords to create initial rules, and then filtering out ones of the initial rules that do not occur in the training data to produce the extracted rules.

Alternative exemplary methods herein automatically collect training data from manually created semantic relations using at least one computerized device. The manually created semantic relations are based on explicit lexical and syntactic information Such exemplary methods automatically extract rules from the training data to produce extracted rules, automatically characterize existing semantic relations in the training data based on co-occurrence of the extracted rules in the existing semantic relations, and automatically construct semantic relation topics based on the characterization of the existing semantic relations using the computerized device. Further, such methods group instances of the training data into the semantic relation topics to detect new semantic relations using the computerized device. The new semantic relations are based on implicit lexical and syntactic information. Additionally, such methods receive at least one input question, identify ones of the new semantic relations that are present in the input question to produce question semantic relations corresponding the input question, and match the question semantic relations to data source semantic relations of at least one data source maintained is a separate device external to the computerized device to generate a plurality of candidate answers. The data source semantic relations comprise ones of the new semantic relations present in the data source. Such methods also calculate an answer score for each of the candidate answers based how closely the question semantic relations match the data source semantic relations, and rank the candidate answers according to the answer score using the computerized device.

A system embodiment comprises a processor and a non-transitory data storage device in communication with the processor. The non-transitory data storage device maintains manually created semantic relations. The processor automatically collects the training data from the manually created semantic relations, automatically extract rules from the training data to produce extracted rules, and automatically characterize existing semantic relations in the training data based on co-occurrence of the extracted rules in the existing semantic relations. Further, the processor automatically constructs semantic relation topics based on the characterization of the existing semantic relations, and group's instances of the training data into the semantic relation topics to detect new semantic relations.

BRIEF DESCRIPTION OF THE DRAWINGS

The embodiments herein will be better understood from the following detailed description with reference to the drawings, which are not necessarily drawing to scale and in which:

FIG. 2 is a schematic diagram illustrating a wavelet according to embodiments herein;

FIG. 3 is a schematic diagram illustrating topic spaces according to embodiments herein;

DETAILED DESCRIPTION

1. Introduction

Figure 1:
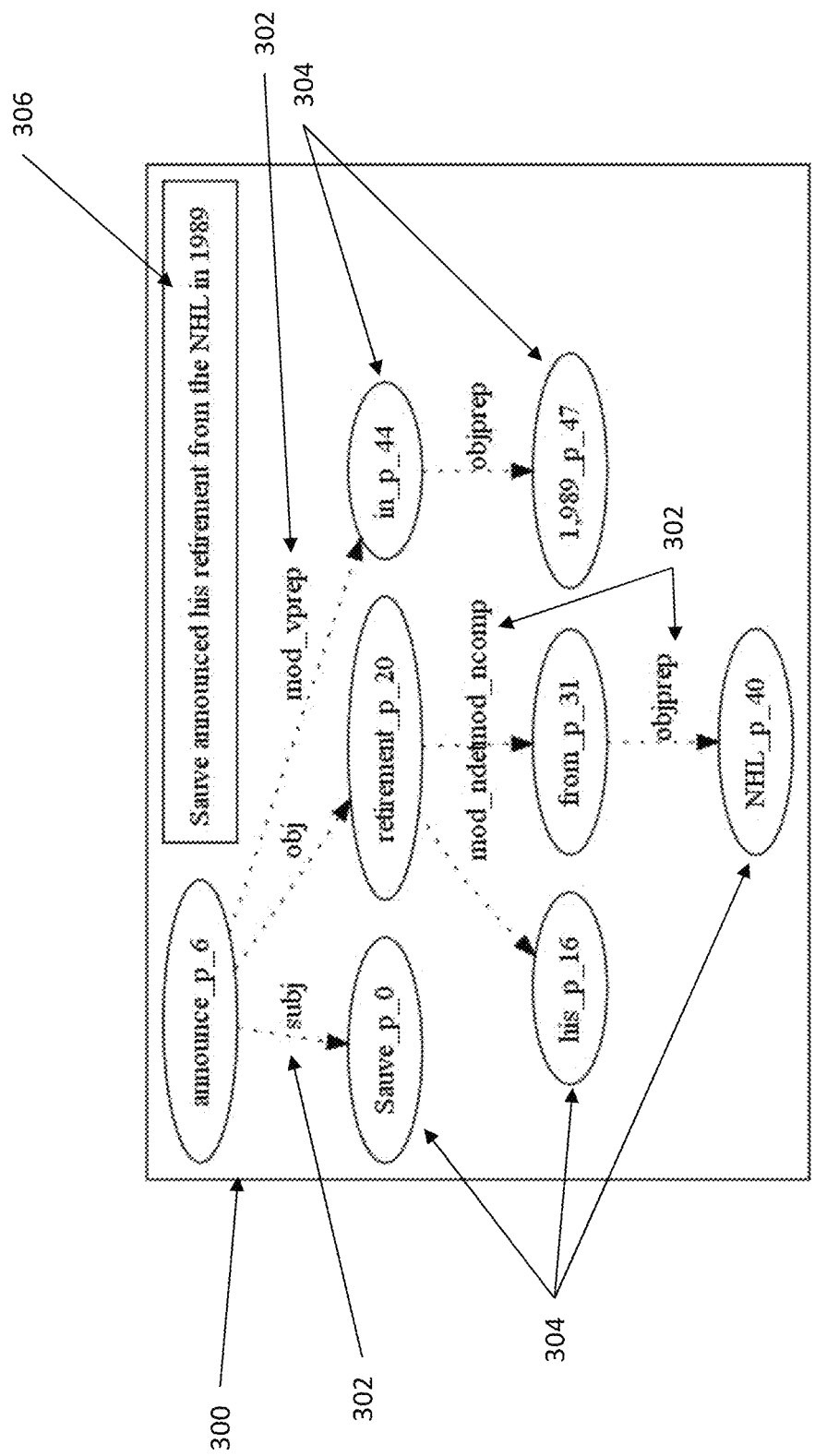
FIG. 1 is a schematic diagram illustrating a dependency tree according to embodiments herein.

As mentioned above, detecting semantic relations in text is very useful. This disclosure describes an approach to the semantic relation detection problem that, instead of relying only on training instances to detect a new relation, leverages the knowledge learned from previously trained relation detectors. Specifically, the systems and methods herein detect a new semantic relation by projecting the new relation's training instances onto a lower dimension topic space constructed from existing relation detectors through a three step process. First, the systems and methods herein construct a large relation repository. In one example herein, a large relation repository of more than 7,000 relations from Wikipedia™ and DBpedia relations (Wikipedia™ Foundation, Inc., San Francisco).

However, the systems and methods herein are not limited to relations within Wikipedia™, but instead are applicable to any item that contains text including, but not limited to literature, databases, networks having textural material, etc. Second, the systems and methods herein construct a set of non-redundant relation topics defined at multiple scales from the relation repository to characterize the existing relations.

Similar to the topics defined over words, each relation topic is an interpretable multinomial distribution over the existing relations. Third, the systems and methods herein integrate the relation topics in a kernel function, and use it together with SVM to construct detectors for new relations.

Although a large set of relations have been identified, adapting the knowledge extracted from these relations for new semantic relations is still a challenging task. Most of the work on domain adaptation of relation detection has focused on how to create detectors from ground up with as little training data as possible through techniques such as bootstrapping. The systems and methods herein take a different approach, focusing on how the knowledge extracted from the existing relations can be reused to help build detectors for new relations. The systems and methods herein reuse knowledge to build a more cost effective relation detector, but there are several challenges associated with reusing knowledge. The first challenge to address in this approach is how to construct a relation repository that has sufficient coverage. Again, for simple illustration purposes only, referring again to the Wikipedia™ example, Wikipedia™ is comprehensive, containing a diverse body of content with significant depth and grows rapidly. Wikipedia™'s infoboxes are particularly interesting for relation extraction. Such infoboxes are short, manually-created, and often have a relational summary of an article: a set of attribute/value pairs describing the article's subject.

Another challenge is how to deal with overlap of relations in the repository. For example, Wikipedia™ authors may make up a name when a new relation is needed without checking if a similar relation has already been created. This leads to relation duplication.

The systems and methods herein refine the relation repository based on an unsupervised multiscale analysis of the correlations between existing relations. This method is parameter free, and able to produce a set of non-redundant relation topics defined at multiple scales. Similar to the topics defined over words, the systems and methods herein define relation topics as multinomial distributions over the existing relations. The relation topics extracted in the current method are interpretable, orthonormal to each other, and can be used as basis relations to re-represent the new relation instances.

The third challenge is how to use the relation topics for a relation detector. The systems and methods herein map relation instances in the new domains to the relation topic space, resulting in a set of new features characterizing the relationship between the relation instances and existing relations. By doing so, background knowledge from the existing relations can be introduced into the new relations, which overcomes the limitations of the existing approaches when the training data is not sufficient. The systems and methods herein fit in to a class of relation extraction research based on "distant supervision", which studies how knowledge and resources external to the target domain can be used to improve relation extraction. The systems and methods herein represent the knowledge from distant supervision using automatically constructed topics. When the systems and methods herein test new instances, they do not need to search against the knowledge base. In addition, the topics below also model the indirect relationship between relations.

Such information cannot be directly found from the knowledge base. The contributions of this disclosure are numerous. The systems and methods herein extract a large amount of training data from Wikipedia™. Part of this step is how one handles noisy data with little human effort. The systems and methods herein present an unsupervised way to construct a set of relation topics at multiple scales. This step is parameter free, and results in a non-redundant, Multi-scale relation topic space. The systems and methods herein design a new kernel for relation detection by integrating the relation topics into the relation detector construction. The experimental results on Wikipedia™ and ACE data. The automatic content extraction projects, (http://projects.ldc.upenn.edu/ace) have confirmed that background-knowledge-based features generated from the Wikipedia™ relation repository can significantly improve the performance over the state-of-the-art relation detection approaches.

Before expanding into a more detailed discussion, some initial definitions are provided (and additional definitions are provided elsewhere in the remainder of the discussion).

Semantic relation: relationships between concepts or meanings.

Semantic relation topic: a multinomial distribution of the existing relations.

Topic space: a space spanned by the topics. Any instance on that space can be represented by a linear combination of the topics.

Training Data: the dataset used to train the statistical relation detection model.

Training data instance: an instance in the training dataset. Such instance contains a relation name, a sentence and two terms in the sentence corresponding to the relation arguments.

Rule: an agreed-upon definition of a relation.

Multinomial distribution: see http://planetmath.org/encyclopedia/MultinomialDistribution.html Diffusion wavelets: a fast multiscale framework for the analysis of functions on discrete (or discretized continuous) structures like graphs, manifolds, and point clouds in Euclidean space. Diffusion wavelets are an extension of classical wavelet theory from harmonic analysis.

2. Extracting Relations from Wikipedia™

In the following simplified Wikipedia™ example used to illustrate the systems and methods herein training data is from two parts: relation instances from DBpedia (extracted from Wikipedia™ infoboxes), and sentences describing the relations from the corresponding Wikipedia™ pages.

2.1 Collecting the Training Data

Since the relations correspond to Wikipedia™ infobox properties, the systems and methods herein use an approach to collect positive training data instances. The systems and methods herein assume that a Wikipedia™ page containing a particular infobox property is likely to express the same relation in the text of the page. The systems and methods herein further assume that the relation is most likely expressed in the first sentence on the page that mentions the arguments of the relation. For example, the Wikipedia™ page for "Albert Einstein" contains an infobox property "alma mater" with value "University of Zurich", and the first sentence mentioning the arguments is the following: "Einstein was awarded a PhD by the University of Zurich", which expresses the relation. When looking for relation arguments on the page, the systems and methods herein go beyond (sub)string matching, and use link information to match entities which may have different surface forms. Using this technique, the systems and methods herein are able to collect a large amount of positive training instances of DBpedia relations.

To get precise type information for the arguments of a DBpedia relation, the systems and methods herein use the DBpedia knowledge base (and the associated YAGO type system. Note that for every Wikipedia™ page, there is a corresponding DBpedia entry which has captured the infobox-properties as RDF triples. Some of the triples include type information, where the subject of the triple is a Wikipedia™ entity, and the object is a YAGO type for the entity. For example, the DBpedia entry for the entity "Albert Einstein" includes YAGO types such as Scientist, Philosopher, Violinist etc. These YAGO types are also linked to appropriate WordNet concepts, providing for accurate sense disambiguation. Thus, for any entity argument of a relation the methods are learning, and the method obtains sense-disambiguated type information (including super-types, sub-types, siblings etc.), which becomes useful generalization features in the relation detection model. Given a common noun, the methods can also retrieve its type information by checking against WordNet.

2.2 Extracting Rules from the Training Data

The systems and methods herein use a set of rules together with their popularities (occurrence count) to characterize a relation. A rule representing the relations between two arguments has five components (ordered): $argument_1$ type, $argument_2$ type, noun, preposition and verb. A rule example of ActiveYearsEndDate relation (about the year that a person retired) is: person100007846/year1520379/-/in/retire.

In this example, $argument_1$ type is person100007846, $argument_2$ type is year115203791, both of which are from YAGO type system. The key words connecting these two arguments are in (preposition) and retire (verb). This rule does not have a noun, so the methods can use a '-' to take the position of noun. The same relation can be represented in many different ways. Another rule example characterizing the same relation is: person100007846/year115203791/retirement/-/announce.

This disclosure considers three types of words: noun, verb and preposition, but those ordinarily skilled in the art would understand that any word type could be utilized and defined with systems and methods herein. It is straightforward to expand or simplify the rules by including more or removing some word types. The keywords are extracted from the shortest path on the dependency tree between the two arguments.

FIG. 1 shows a diagram 300 of a dependency tree example. The dependency tree 300 represents grammatical relations 302 between words 302 in a sentence 306. The systems and methods herein used a slot grammar parser to generate the parse tree of each sentence. Note that there could be multiple paths between two arguments in the tree. The systems and methods herein can take the shortest path into consideration. The popularity value corresponding to each rule represents how many times this rule applies to the given relation in the given data. Multiple rules can be constructed from one relation instance, if multiple argument types are associated with the instance, or multiple nouns, prepositions or verbs are in the dependency path.

2.3 Cleaning the Training Data

To find a sentence on the Wikipedia™ page that is likely to express a relation in its infobox, the methods consider the first sentence on the page that mentions both arguments of the relation. This heuristic approach returns reasonably good results, but brings in about 20% noise in the form of false positives, which is a concern when building an accurate statistical relation detector. To address this issue, there are developed a two-step technique to automatically remove some of the noisy data. In the first step, the methods extract popular argument types and keywords for each DBpedia relation from the given data, and then use the combinations of those types and words to create initial rules. Many of the argument types and keywords introduced by the noisy data are often not very popular, so they can be filtered out in the first step. Not all initial rules make sense. In the second step, the methods check each rule against the training data to see if that rule really exists in the training data or not. If it does not exist, the methods filter it out. If a sentence does not have a single rule passing the above procedure, that sentence will be removed. Using the above techniques, the methods collect examples characterizing 7,628 DBpedia relations.

3. Learning Multiscale Relation Topics

An extra step extracting knowledge from the raw data is needed for two reasons: Firstly, many DBpedia relations are inter-related. For example, some DBpedia relations have a subclass relationship, e.g. "AcademyAward" and "Award"; others overlap in their scope and use, e.g., "Composer" and "Artist"; while some are equivalent, e.g., "DateOfBirth" and "BirthDate". Secondly, a fairly large amount of the noisy labels are still in the training data.

To reveal the intrinsic structure of the current DBpedia relation space and filter out noise, the systems and methods herein carry out a correlation analysis of relations in the training data, resulting in a relation topic space. Each relation topic is a multinomial distribution over the existing relations. The systems and methods herein adapted diffusion wavelets for this task. Compared to the other well-known topic extraction methods like Latent Dirichlet Allocation (LDA) and Latent Semantic Index (LSI), diffusion wavelets can efficiently extract a hierarchy of interpretable topics without any user input parameter. Similar to the topics defined over words (S. Deerwester, S. T. Dumais, G. W. Furnas, T. K. Landauer, and R. Harshman. 1990. Indexing by latent semantic analysis. Journal of the American Society for Information Science, 41(6):391.407.; D. Blei, A. Ng, and M. Jordan. 2003. Latent Dirichlet allocation. Journal of Machine Learning Research, 3:993.1022), the systems and methods herein define relation topics as multinomial distributions over the existing DBpedia relations. One relation topic example is as follows: [doctoraladvisor (0.683366), doctoralstudents (0.113201), candidate (0.014662), academicadvisors(0.008623), notablestudents (0.003829), college (0.003021), operatingsystem (0.002964), combatant (0.002826), influences (0.002285), training (0.002148), . . . ], where doctoral advisor is a DBpedia relation and 0.683366 is its contribution to this relation topic. The length of this topic vector is 7,628, which is the total number of DBpedia relations.

3.1 An Overview of Diffusion Wavelets

The diffusion wavelets systems and methods herein constructs a compressed representation of the dyadic powers of a square matrix by representing the associated matrices at each scale not in terms of the original (unit vector) basis, but rather using a set of custom generated bases. FIG. 2 summarizes the procedure to generate diffusion wavelets. Given a matrix T, the QR (a modified QR decomposition) subroutine decomposes T into an orthogonal matrix Q and a triangular matrix R such that T≈QR, where $|T_{i,k}-(QR)_{i,k}|<\epsilon$ for any i and k. Columns in Q are orthonormal basis functions spanning the column space of T at the finest scale. RQ is the new representation of T with respect to the space spanned by the columns of Q (this result is based on the matrix invariant subspace theory). At an arbitrary level j, DWT learns the basis functions from $T^{2^j}$ using QR. Compared to the number of basis functions spanning $T^{2^j}$'s original column space, the systems and methods herein usually get fewer basis functions, since some high frequency information corresponding to the "noise" at that level) can be filtered out. DWT then computes $T^{2^{j+1}}$ using the low frequency representation of $T^{2^j}$ and the procedure repeats.

FIG. 2 illustrates an exemplary diffusion wavelets construct multiscale representations of the input matrix at different scales 320. QR is a modified QR decomposition. J is the max step number (this is optional, since the systems and methods herein automatically terminates when it reaches a matrix of size 1×1). The notation $[T]_{\phi_a}^{\phi_b}$ denotes matrix T whose column space is represented using basis $\phi_b$ at scale b, and row space is represented using basis $\phi_a$ at scale a. The notation $[\phi_b]_{\phi_a}$ denotes basis $\phi_b$ represented on the basis $\phi_a$. At an arbitrary scale j, the systems and methods herein have $p_j$ basis functions, and length of each function is $l_j$. The number of $p_j$ is determined by the intrinsic structure of the given dataset in QR routine. $[T]_{\phi_a}^{\phi_b}$ is a $P_b \times l_a$ matrix, and $[\phi_b]_{\phi_a}$ is an $l_a \times p_b$ matrix.

3.2 Constructing Multiscale Relation Topics

Learning Relation Correlations.

Assume there are M relations, and the $i^{th}$ of them is characterized by $m_i$<rule, popularity>pairs. The systems and methods herein use s(a,b) to represent the similarity between the $a^{th}$ and $b^{th}$ relations. To compute s(a,b), the systems and methods herein first normalize the popularities for each relation, and then look for the rules that are shared by both relation a and b. The systems and methods herein use the product of corresponding popularity values to represent the similarity score between two relations with respect to each common rule. s(a,b) is set to the sum of such scores over all common rules. The relation-relation correlation matrix S is constructed as follows:

$$S = \begin{bmatrix} s(1;1) & \ldots & s(1;M) \\ \ldots & \ldots & \ldots \\ s(M;1) & \ldots & s(M;M) \end{bmatrix}$$

There are more than 200,000 argument types, tens of thousands of distinct nouns, prepositions, and verbs, so they potentially have trillions of distinct rules. One rule may appear in multiple relations. The more rules two relations share, the more related two relations should be. The rules shared across different relations offer us a way to model the correlations between different relations, and further allow us to create relation topics. The rules can also be simplified. For example, one may treat $argument_1$, $argument_2$, noun, preposition and verb separately. This results in simple rules that only involve in one argument type or word. The correlations between relations are then computed only based on one particular component like $argument_1$, noun, etc.

Theoretical Analysis.

Matrix S models the correlations between relations in the training data. Once S is constructed, the systems and methods herein adapt diffusion wavelets [DWT] to automatically extract the basis functions spanning the original column space of S at multiple scales. One strength of the approach is that it is data-driven, largely parameter-free and can automatically determine the number of levels of the topical hierarchy, as well as the topics at each level. However, to apply diffusion wavelets to S, the systems and methods herein first need to show that S is a positive semi-definite matrix. This property guarantees that all eigenvalues of S are ≥0. Depending on the way the systems and methods herein formalize the rules, the methods to validate this property are slightly different. When the systems and methods herein treat $argument_1$, $argument_2$, noun, preposition and verb separately, it is straightforward to see the property holds. In Theorem 1, this shows the property also holds when the systems and methods herein use more complicated rules (using the 5-tuple rule in Section 2.2 as an example in the proof).

Theorem 1 S is a Positive Semi-Definite matrix.

Proof: An arbitrary rule $r_i$ is uniquely characterized by a five tuple: $argument_1$ type/$argument_2$ type/noun/preposition/verb. Since the number of distinct argument types and words are constants, the number of all possible rules is also a constant: R.

If the systems and methods herein treat each rule as a feature, then the set of rules characterizing an arbitrary relation $r_i$ can be represented as a point $[p_i^1, \ldots, p_i^R]$ in a latent R dimensional rule space, where $p_i^j$ represents the popularity of rule j in relation $r_i$ in the given data.

The systems and methods herein can verify that the way to compute s(a, b) is the same as $s(a,b) = <[p_a^1 \ldots p_a^R], [p_b^1 \ldots p_b^R]>$, where <.,.> is the cosine similarity (kernel). It follows directly from the definition of positive semidefinite matrix (PSD) that S is PSD.

The systems and methods herein construct multiscale relation topics by applying DWT to decompose $S/\lambda_{max}(S)$, where $\lambda_{max}(S)$ represents the largest eigenvalue of S. Theorem 2 shows that this decomposition will converge, resulting in a relation topic hierarchy with one single topic at the top level.

Theorem 2 Let $\lambda_{max}(S)$ represent the largest eigenvalue of matrix S, then $DWT(S/\lambda_{max}(S),\epsilon)$ produces a set of nested subspaces of the column space of S, and the highest level of the resulting subspace hierarchy is spanned by one basis function.

Proof: From Theorem 1, the systems and methods herein know that S is a PSD matrix. This means $\lambda_{max}(S) \in [0, +\infty)$ (all eigenvalues of S are non-negative). This further implies that $\Lambda(S)/\lambda_{max}(S) \in [0,1]$ where $\Lambda(S)$ represents any eigenvalue of S.

The idea underlying diffusion wavelets is based on decomposing the spectrum of an input matrix into various spectral bands, spanned by basis functions. Let $T=S/\lambda_{max}(S)$. In FIG. 2, the systems and methods herein construct spectral bands of eigenvalues, whose associated eigenvectors span the corresponding subspaces. Define dyadic spatial scales $t_j$ as $$t_j = \sum_{t=0}^{j} 2^t = 2^{j+1} - 1, j \geq 0.$$

At each spatial scale, the spectral band is defined as:

$$\Omega_j(T) = \{\lambda \in \Lambda(T), \lambda^{2^j} \geq \epsilon\},$$

where $\Lambda(T)$ represents any eigenvalue of T, and $\epsilon \in 2(0; 1)$ is a pre-defined threshold in FIG. 2. The systems and methods herein can now associate with each of the spectral bands a vector subspace spanned by the corresponding eigenvectors:

$$V_j = \left\langle \{\epsilon_\lambda : \lambda \in \Lambda(T), \lambda^{2^j} \geq \epsilon\} \right\rangle, j \geq 0.$$

In the limit, the systems and methods herein obtain $$\lim_{j \to \infty} = V_j = \langle \{\epsilon_\lambda : \lambda = 1\} \rangle.$$

That is, the highest level of the resulting subspace hierarchy is spanned by the eigenvector associated with the largest eigenvalue of T.

This result shows that the multiscale analysis of the relation space will automatically terminate at the level spanned by one basis, which is the most popular relation topic in the training data.

3.3 High Level Explanation

Figure 3:
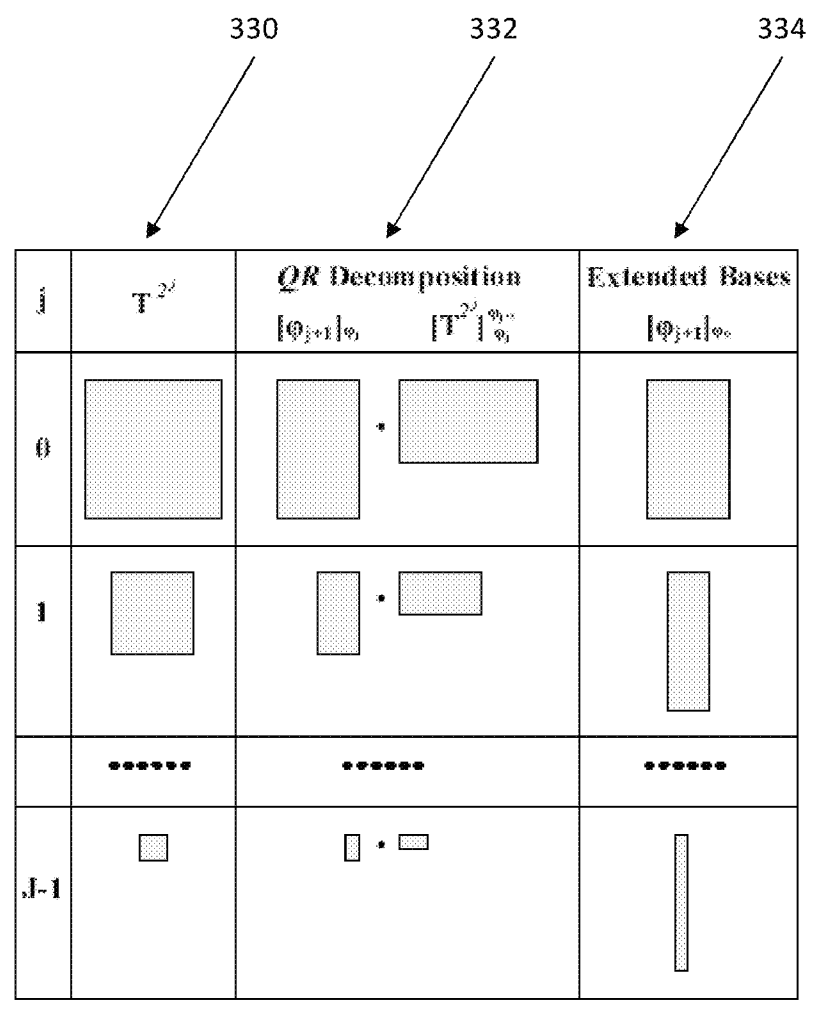

The systems and methods herein first create a set of rules to characterize each input relation. Since these rules may occur in multiple relations, they provide a way to model the co-occurrence relationship between different relations. The systems and methods herein starts with the relation co-occurrence matrix and then repeatedly applies QR decomposition to learn the topics at the current level while at the same time modifying the matrix to focus more on low-frequency indirect co-occurrences (between relations) for the next level. Running DWT is equivalent to running a Markov chain on the input data forward in time, integrating the local geometry and therefore revealing the relevant geometric structures of the whole data set at different scales. At scale j, the representation of $T^{2^{j+1}}$ is compressed based on the amount of remaining information and the desired precision. This procedure is illustrated in FIG. 3. In the resulting topic space, instances with related relations will be grouped together. This approach may significantly help us detect new relations, since it potentially expands the information brought in by new relation instances from making use of the knowledge extracted from the existing relation repository.

3.4 Features

As shown in FIG. 3, the topic spaces 330, 332, 334 at different levels are spanned by a different number of basis functions. These numbers reveal the dimensions of the relevant geometric structures of data at different levels. These numbers are completely data-driven: the diffusion wavelets approach can automatically find the number of levels and simultaneously generate the topics at each level. Most multiscale topics are interpretable (due to the sparsity of the scaling functions), such that the systems and methods herein can interpret the topics at different scales and select the best scale for embedding. Compared to bootstrapping approach, the systems and methods herein are accumulative; that is as the system learns more relations, it gets better at learning new relations. Because the systems and methods herein approach takes advantage of the previously learned relations, and the topic space is enriched as the systems and methods herein learn more and more relations.

The systems and methods herein can use diffusion wavelets (DWT) rather than other hierarchy topic models like hLDA to extract relation topics for two reasons. First, DWT is parameter free while other models need some user-input parameters like hierarchy level. Second, DWT is more efficient than the other models. After the relation correlation matrix is constructed, DWT only needs a couple of minutes to extract multiscale topics on a regular computer. A direct experimental comparison between DWT and hLDA can be found.

4. Constructing Relation Detectors with Multiscale Relation Topics

4.1 Project Relation Instances onto Topics

When the systems and methods herein design detectors for new relations, the systems and methods herein treat $arg_1$, $arg_2$, noun, and verb separately to get stronger correlations between relations. The systems and methods herein do not directly use preposition. Any DBpedia relation $r \in \{1, \ldots, M\}$ is represented with 4 vectors $r_t = [r_t(1), \ldots r_t(N_t)]$, where $t \in \{arg_1, arg_2, noun, verb\}$, $N_t$ represents the size of the vocabulary set of the type t component in the Wikipedia™ training data, and $r_t(j)$ represents the occurrence count of type t component in relation r. For example, $N_{verb}$ is the size of the verb vocabulary set in the training data and $r_{verb}(j)$ represents the occurrence count of the $j^{th}$ verb in relation r. When a new relation instance x is given, the systems and methods herein extract the dependency path between two arguments, and create four vectors $x_t$, where $t\{arg_1, arg_2, noun, verb\}$, following the same format as $r_t$. The projection result of $x_t$ onto the DBpedia relation space $X_t$ is as follows:

$$X_t = [<r_t(1), x_t(1)>, \ldots, <r_t(M), x_t(M)>]$$

where $<.,.>$ is the cosine similarity of two vectors. At level k, the embedding of x is $E_x^k = [E_{X_{arg1}}^k, E_{X_{arg2}}^k, E_{X_{noun}}^k, E_{X_{verb}}^k]$, where $E_{x_t}^k = ([\phi_k]_{\phi_0})^T X_t$, and $[\phi_k]_{\phi_0}$ is defined in FIG. 2.

4.2 Design New Kernel Using Topic Features

The systems and methods herein combine $E_x^k$ with 3 existing kernels ($K_{Argument}$, $K_{Path}$ and $K_{BOW}$) to create a new kernel for relation detection.

(1) $K_{Argument}$ matches two arguments, it returns the number of common argument types that the input arguments share.

(2) $K_{path}$ matches two dependency paths. This kernel is formally defined. The systems and methods herein extended this kernel by also matching the common nouns, prepositions and verbs in the dependency paths. The systems and methods herein assign weight 1 to verbs, 0.5 to nouns and prepositions.

(3) $K_{BOW}$ models the number of common nouns, prepositions and verbs in the given sentences but not in the dependency paths. Since these words are not as important as the words inside the dependency path, the systems and methods herein assign weight 0.25 to them.

(4) $K_{TF_k}(x,y) = <E_x^k, E_y^k>$, where x, y are two input relation instances, and $<.,.>$ models the cosine similarity of two vectors. TF stands for topic feature.

(5) The final kernel used in this disclosure is $$\alpha_1 K_{Argument} + \alpha_2 K_{Path} + \alpha_3 K_{BOW} + \alpha_4 K_{TF_k},$$

where $\alpha_i$ can be tuned for each individual domain. In this disclosure, the systems and methods herein set $\alpha_i = 1$ for $i \in \{1, 2, 3, 4\}$.

4.3 Systems and methods herein to Construct Relation Detectors

1. Construct a relation repository from Wikipedia™
   (a) Collect training data from Wikipedia™ and DBpedia;
   (b) Clean the data representing each input relation;

(c) Create relation correlation matrix S following the approach described in Section 3.2, resulting in an M×M matrix.

2. Create multiscale relation topics.

$[\phi_k]_{\phi_0} = DWT(S/\lambda_{max}(S), \epsilon)$, where DWT( ) is the diffusion wavelets implementation described in Section 3.1. $[(\phi_k]_{\phi_0}$ are the scaling function bases at level k represented as an M×$p_k$ matrix, k=1, . . . , h represents the level in the topic hierarchy. The value of $p_k$ is determined in DWT( ) based on the intrinsic structure of the given dataset. Columns of $[\phi_k]_{\phi_0}$ are used as relation topics at level k.

3. Construct relation detectors for new relations.

Given the training data from a new relation, project the data onto level k of the multiscale topic hierarchy, where k is chosen by users. Apply SVM classifiers together with the kernel to create detectors for new relations.

Figure 4:
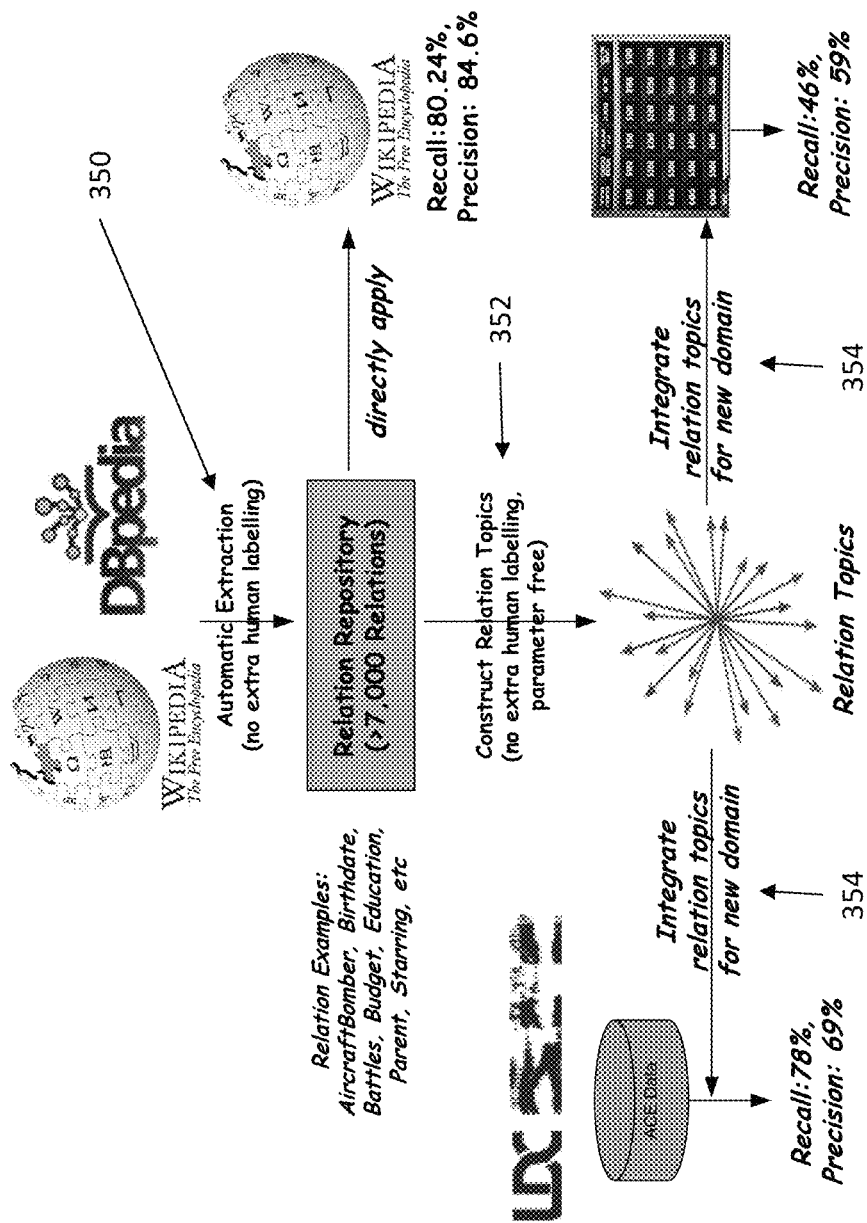
FIG. 4 is a schematic diagram illustrating a relation topic-based relation detection component according to embodiments herein.

Thus, as shown above, this disclosure provides an approach to create detectors for new relations integrating the knowledge extracted from the existing relations. The contributions of this disclosure are numerous. The systems and methods herein provide an automatic way to collect training data for more than 7,000 relations from Wikipedia™ and DBpedia. The systems and methods herein present an unsupervised way to construct a set of relation topics at multiple scales. Item 352 in FIG. 4 illustrates the process of constructing relation topics. Different from the topics defined over words, relation topics are defined over the existing relations. The systems and methods herein design a new kernel for relation detection by integrating the relation topics in the representation of the relation instances. By leveraging the knowledge extracted from the Wikipedia™ relation repository, the approach herein significantly improves the performance over the state-of-the-art approaches on ACE data. This disclosure makes use of all DBpedia relations to create relation topics.

As noted above, detecting semantic relations in text is an active problem area in natural language processing and information retrieval. For question answering, there are many advantages of detecting relations in the question text, as it allows background relational knowledge to be leveraged to generate potential answers or find additional evidence to score supporting passages. This portion of the disclosure presents an approach to broad-domain relation extraction and scoring in the DeepQA question answering framework based on relation topics. The DeepQA question answering framework allows for a wide variety of candidate answer generators and scorers that enable it to generate candidate answers and compute a match (or alignment) between the question text and the supporting textual evidence found for a given candidate (D. Ferrucci, E. Brown, and A. Lally, DeepQ A Architecture and System Overview. Submitted to IBM Journal of Research and Development; J. Chu-Carroll, J. Fan, B. Boguraev, D. Carmel, D. Sheinwald, and C. Welty, Finding Needles in the Haystack: Search and Candidate Generation. Submitted to IBM Journal of Research and Development., J. W. Murdock, J. Fan, A. Lally, H. Shima, and B. Boguraev, "Textual Evidence Gathering and Analysis". Submitted to IBM Journal of Research and Development). The text analytics used in these modules rely primarily on surface level information or the predicate argument structure (PAS; see M. McCord, J. W. Murdock, and B. Boguraev, Deep Parsing in Watson. Submitted to IBM Journal of Research and Development) of the text fragments under consideration. In this disclosure, the systems and methods herein focus on analytics that go beyond explicit lexical and syntactic information and instead detect implicit semantic relations in the text.

Table 1 illustrates instances of such implicit semantic relations in Jeopardy!™ data. For instance, the question "The Screwtape Letters" from a senior devil to an under devil are by this man better known for children's books" contains an instance of the "author" relation, whose arguments are identified as "this man" and "The Screwtape Letters". Detecting such implicit relations in the question text is very useful for question answering because it enables background knowledge bases to be leveraged to find potential answers to the question (for the examples in Table 1, the relations are from the DBpedia knowledge base (Soren Auer, Christian Bizer, Georgi Kobilarov, Jens Lehmann, Richard Cyganiak, and Zachary Ives. 2007. DBpedia: A nucleus for a web of open data. In Proceedings of the 6th International Semantic Web Conference, Busan, Korea, pages 11.15. Springer); thus the systems and methods herein can look up potential answers in this resource based on the relation detected).

TABLE 1

Examples of Jeopardy! ™ questions and detected relations.

| Jeopardy! ™ Question | Relation Detected (Relations are from the DBpedia Knowledge Base) |
|---|---|
| MOTHERS & SONS: Though only separated by one year in real life, she played mother to son Colin Farrell in "Alexander" | starring (she, "Alexander") |
| THE DEVIL: "The Screwtape Letters" from a senior devil to an under devil are by this man better known for children's books | author (man, "The Screwtape Letters") |
| THE LONE REPRESENTATIVE: Michael Castle from this state with 3 counties: New Castle, Kent and Sussex | residence("Michael Castle", state) |

Another application of semantic relation detection is for passage scoring. Consider the question: "This hockey defenseman ended his career on Jun. 5, 2008" and a supporting passage: "On Jun. 5, 2008, Wesley announced his retirement after his 20th NHL season".

The question and the passage share very few keywords in common (especially verbs and nouns) and thus any similarity between the two computed with explicit term matching based approaches would be low. However, if a relation detector can find that the question and the passage share a common semantic relation, e.g. "ActiveYearsEndDate" (also defined in the DBpedia knowledge base), an appropriate scoring systems and methods herein can arrive at a higher semantic similarity score.

In this disclosure, the systems and methods herein present a relation topic based-approach to build the relation extraction and passage scoring components for DeepQA. These components make use of several other DeepQA components, including the English Slot Grammar (ESG) Parser (Michael McCord. 1995. Slot grammar: A system for simpler construction of practical natural language grammars. Communications of the ACM, 38(11)), Entity Disambiguation and Matching (J. W. Murdock, A. Kalyanpur, J. Fan, C. Welty, D. Ferrucci, D. Gondek, H. Kanayama, and L. Zhang, Type Coercion in Jeopardy!™. Submitted to IBM Journal of Research and Development), Predicate Disambiguation and Matching, and Answer Lookup.

The systems and methods herein evaluate the relation detection at two levels. At the component level, the systems and methods herein measure how well the approach detects semantic relations in Wikipedia™ data, ACE data and Jeopardy!™ questions. At the system level, the systems and methods herein evaluate the overall end-to-end impact of relation detection on Watson's question answering performance.

This disclosure continues with the statistical relation detection and scoring systems and methods. The next section describes how this work fits in the DeepQA architecture. The last two sections summarize the experimental results and provide some concluding remarks.

One motivation for the creation of relation topics is that the systems and methods herein can project any relation instance candidate (including the candidates from unseen relations) onto the relation topic space. This step results in a set of relation topic features that reflects the relationship between the given candidate and the known relations. Such topic features are used in an SVM classifier (through the kernel function, see below) to detect relations from the relation instance candidates or compute the similarity score between the question and the passage.

Relation Detection in DeepQA with Relation Topics

Figure 5:
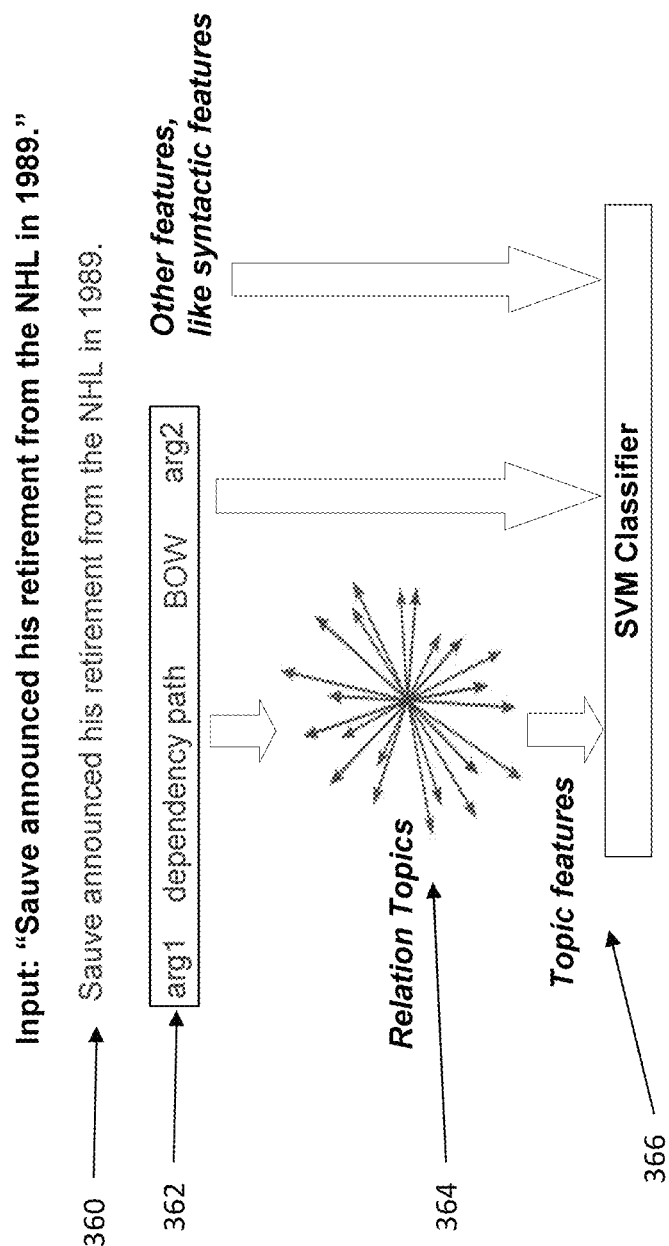
FIG. 5 is a schematic diagram illustrating a kernel according to embodiments herein.

In this subsection, the systems and methods herein describe the technique to do relation detection in DeepQA. The model (or classifier) that does relation detection is trained using Support Vector Machines (SVM). SVM classifiers use a kernel function to model similarity among the instances. The kernel function combines the relation topic features with three other existing kernels that match arguments, dependency paths and the common words shared by two instances (see FIG. 5). As mentioned above, the text "Sauve announced his retirement from the NHL in 1989" in item 360 is represented by the following features 362 argument1type [Person, Athlete], argument2type [Year], syntactic features in the dependency path [subj, mod_vprep, objprep], words in the dependency path [announce (verb), in (prep)], and words in the whole sentence [Sauve (noun), announce (verb), his (adj), retirement (noun), from (prep), NHL (noun), in (prep), 1989 (noun)]. In this representation, the two arguments are ordered, with the subject coming first and the object second. If the order is not given, the systems and methods herein consider both combinations.

With respect to training, when training data from DBpedia and Wikipedia™, the arguments of each relation instance are already given 364 and the order is always from "subject" to "object". The systems and methods herein train one SVM model 366 with the kernel for each relation. The negative training set for each relation is created by sampling the instances from the other relations.

With respect to testing, given a test instance, the testing procedure can have four steps:

1. Detect Argument Pairs: For Jeopardy!™ questions, the focus and each named entity in the question make an argument pair. For an arbitrary sentence, the systems and methods herein use ESG to extract all predicate nodes, and any predicate node pair makes a pair of relation arguments.

2. Detect Argument Order: In some situations, the dependency path tells us which argument is "subject" and which is "object". Otherwise, the systems and methods herein try both combinations.

3. Filtering: To mitigate the noise introduced by false positives in the training data extraction heuristics, and to provide a way to balance the recall and precision, the systems and methods herein have also developed a key word filter and an argument type filter to filter out noisy relation instances.

On a relation-per-relation basis, the systems and methods herein extract the most popular verbs, nouns, and prepositions (these are deemed more important than the other words to detect relations) from the dependency path of each training positive instance. For any given relation, the systems and methods herein add the words that occur in at least 10% of positive instances or at least 3 times in its positive training dataset to a list to create a key word filter. If a given test instance does not have any key word in this list, it will be filtered out. The systems and methods herein also designed an argument type filter exploiting the YAGO type hierarchy, which extracts the most common parent type in YAGO for each argument in each relation. The filter then rejects test instances that have at least one argument not under the corresponding common parent type.

The systems and methods herein drop the test instance if it does not pass either the key word filter or the argument type filter (this step is optional).

4. Apply: Apply all the relation detectors to the test instance to extract semantic relations.

Unstructured Passage Scoring with Relation Topics

When the question and a passage share very few keywords, any similarity between them computed using term matching based approaches would be low. In such situations, if a relation detector can find shared relations between the question and the passage, this can lead to a higher semantic similarity score.

One way to integrate this idea in the DeepQA framework is to use the relation detectors to find all relations expressed in both the question and each given passage. The number of relations they share is then used to score the passage. This approach, however, does not work well in practice for two reasons. Firstly, the open domain setting of DeepQA requires that a large set of relation types be covered. In this case, there are more than 7,000 relation models that need to be applied to each given passage. Considering the huge amount of passages to be processed, this approach is not realistic in real-world applications. Secondly, many semantic relations are not covered in DBpedia. If a question and a passage share some significant relations that are not in DBpedia, the passage will not be scored appropriately. To address these challenges, the methods developed systems and methods herein for passage scoring in DeepQA by integrating relation topics extracted from Wikipedia™ and DBpedia data in this approach.

The information extracted from relation topics is useful for unstructured passage scoring. For example, if argument types "town", "city", "state", etc. often occur in the same relations (like "birthPlace", "deathPlace"), the topic extraction approach will automatically learn a topic from that. When the systems and methods herein align argument types "town" and "city" in the relation topic space, the systems and methods herein will get a high similarity score since the projection results of them on topic space are close to each other. Words with similar meanings will also be treated in a similar way. In relation topic space, instances from related relations will be grouped together. Passages that only have relations remotely matching the relations expressed in the question will still be scored appropriately since the indirect relationship between relations is also captured in the topic space. Using relation topics may significantly help score passages, and it potentially expands the information brought in by each passage from making use of the knowledge extracted from the existing relation repository.

In DeepQA, the passage score represents how well a given passage matches the question, and is used to rank candidate answers derived from the passages. For the sake of simplicity, the systems and methods herein assume that the question has one focus, and the passage has one candidate answer. In the following question-passage example, the question focus is "state" and candidate is "state of Quintana Roo".

Question: It's Mexico's northernmost state, but part of its name means "low". Passage: Cabo Catoche or Cape Catoche, in the Mexican state of Quintana Roo, is the northernmost point on the Yucatan Peninsula. It is about 53 km (33 miles) north of the city of Cancun.

To align the question and the passage, the systems and methods herein first find pairs of matching terms, which are the terms that resemble each other semantically. In this example, there are two pairs of matching terms [Mexico's, Mexican, via stem: Mexico] and [northernmost, northernmost]. The systems and methods herein assume that the focus and one matching term in the question make a semantic relation. The systems and methods herein then assume that the candidate variant and the corresponding matching term in the passage also make a relation. The systems and methods herein project these two relation instances onto the relation topic space. The cosine similarity of the projection results is used to score the passage for the selected matching terms. In this example, there are two matching pairs. The sum of two matching scores is used as the final passage score. Since the matching terms other than the focus-candidate pair are always quite similar to each other ([northernmost, northernmost], in the example above), the systems and methods herein do not take them into consideration when the systems and methods herein compute cosine similarity. The passage score is used as a feature and used for candidate answer ranking (D. Gondek, A. Lally, A. Kalyanpur, and J. W. Murdock, "Merging and Ranking of Answers". Submitted to IBM Journal of Research and Development 24)).

Integrating in DeepQA

The relation detection component is used in several places in the DeepQA pipeline.

In the question analysis step, the systems and methods herein attempt to identify relations between the focus and each named entity in the question. If a relation is detected, the systems and methods herein invoke the Answer Lookup component to search against structured knowledge bases (such as DBpedia) for all instances of the relation which contain the given named entity as one argument. The other argument of the relation is then treated as a potential candidate answer.

Relation extraction—both on the question side and content side—is used in supporting passage scoring, in particular, by components such as LFACS and by the unstructured passage scoring component described in the previous section.

Thus, as shown above, this disclosure presents an approach for relation extraction and unstructured passage scoring in DeepQA, using statistically derived relation topic models. Effectiveness of the approach is demonstrated using multiple datasets at both the component level and the system level. At the component level, the relation detector outperforms the state-of-the-art approaches on ACE data, which is the most popularly used relation detection test dataset.

At the system level, the candidate generator component based on relation detection does not have a significant impact on the system, for three reasons: (1) Most questions that the relation detectors fire on have already been answered correctly, leaving us with a small headroom to improve the system performance; (2) DBpedia has poor coverage on some relations that are of relevance; (3) The training data from Wikipedia™ and the test data from Jeopardy!™ are quite different. More advanced domain adaptation approaches are still needed to make the performance on Jeopardy!™ data match the performance on Wikipedia™ data. At the system level, the unstructured passage scoring component based on relation detection has a statistically significant impact on the system, demonstrating that the information brought in by semantic relations is important to open-domain QA systems.

Figure 6:
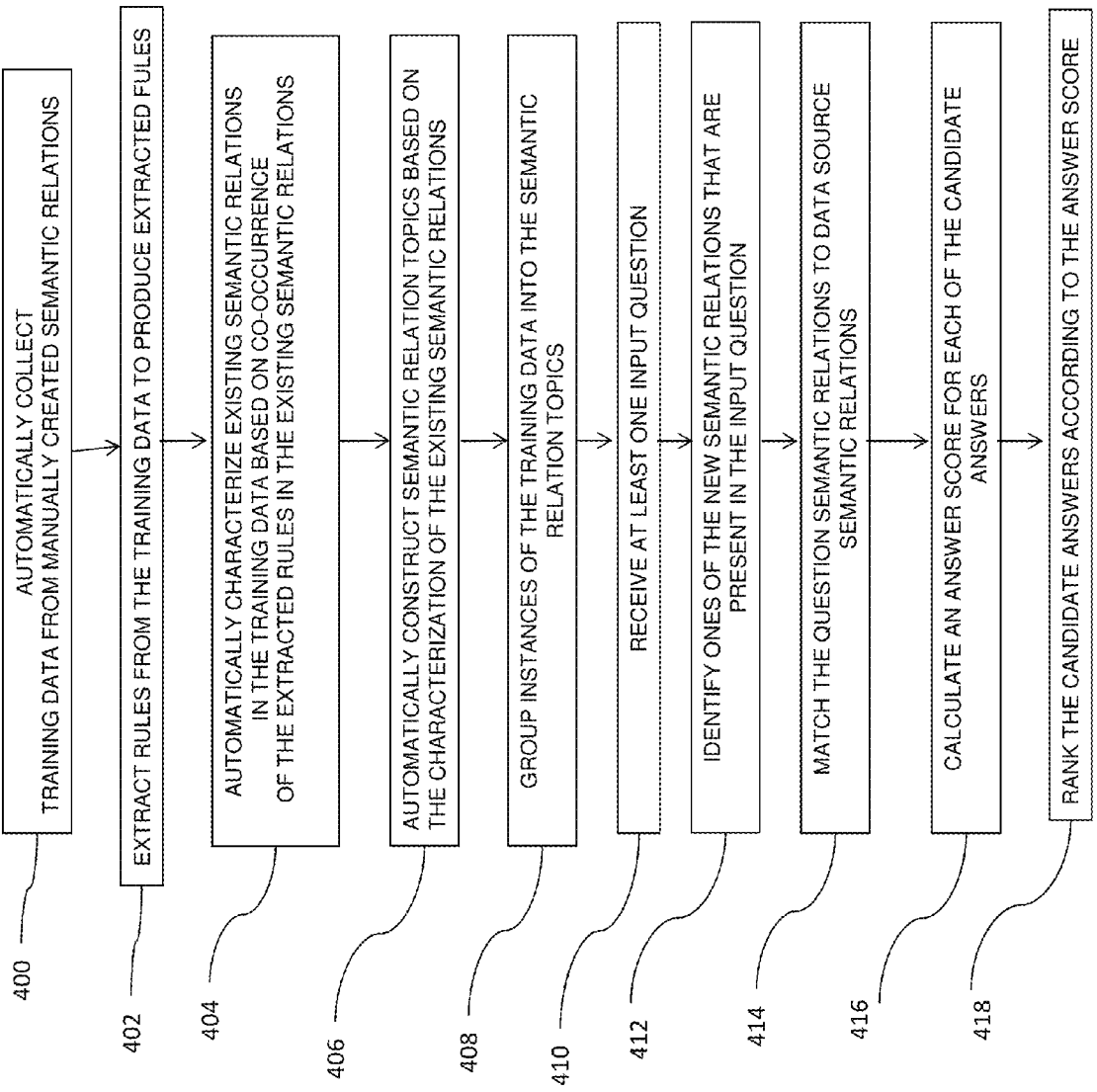
FIG. 6 is a flow diagram illustrating embodiments herein.

As shown in flowchart form in FIG. 6, the systems and methods herein automatically collect training data from manually created semantic relations 400 using at least one computerized device. The manually created semantic relations are based on explicit lexical and syntactic information. Such exemplary methods automatically extract rules from the training data 402 to produce extracted rules, automatically characterize existing semantic relations in the training data based on co-occurrence of the extracted rules in the existing semantic relations 404, and automatically construct semantic relation topics based on the characterization of the existing semantic relations 406, all using the computerized device. Further, such methods group instances of the training data into the semantic relation topics 408 to detect new semantic relations using the computerized device. The new semantic relations are based on implicit lexical and syntactic information. Additionally, such methods receive at least one input question 410, identify ones of the new semantic relations that are present in the input question 412 to produce question semantic relations corresponding the input question, and match the question semantic relations to data source semantic relations 414 of at least one data source maintained is a separate device external to the computerized device to generate a plurality of candidate answers. The data source semantic relations comprise ones of the new semantic relations present in the data source. Such methods also calculate an answer score for each of the candidate answers 416 based how closely the question semantic relations match the data source semantic relations, and rank the candidate answers 418 according to the answer score using the computerized device.

As will be appreciated by one skilled in the art, aspects of the systems and methods herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments herein. It will be understood that each block of the flowchart illustrations and/or two-dimensional block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
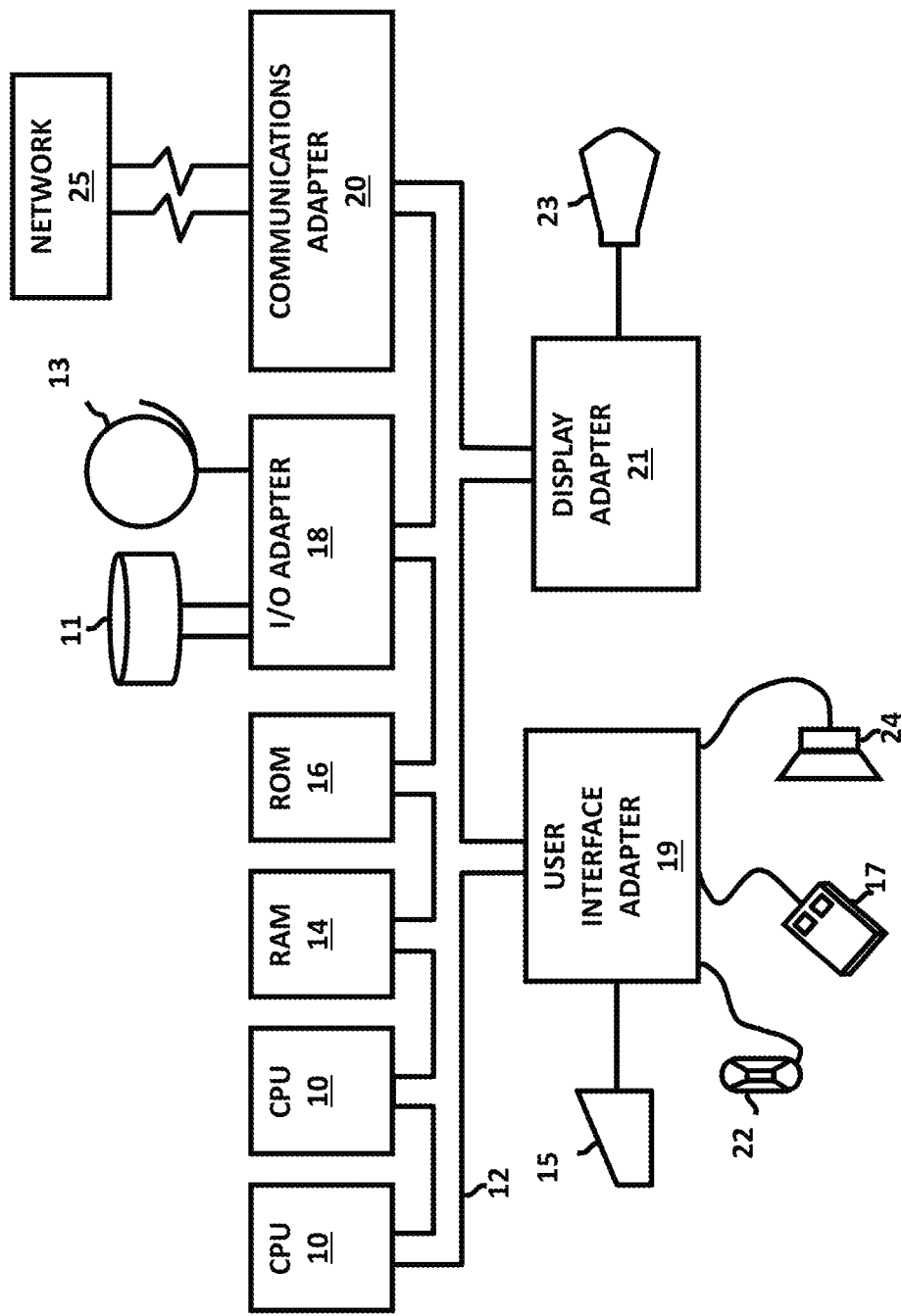
FIG. 7 is a schematic diagram of a hardware system according to embodiments herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment types include loading directly in the client, server and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Send the process software directly to a directory on the client computer hard drive. When there are proxy servers, the process will, select the proxy server code, determine on which computers to place the proxy servers' code, transmit the proxy server code, and then install the proxy server code on the proxy computer. The process software will be transmitted to the proxy server then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Figure 8:
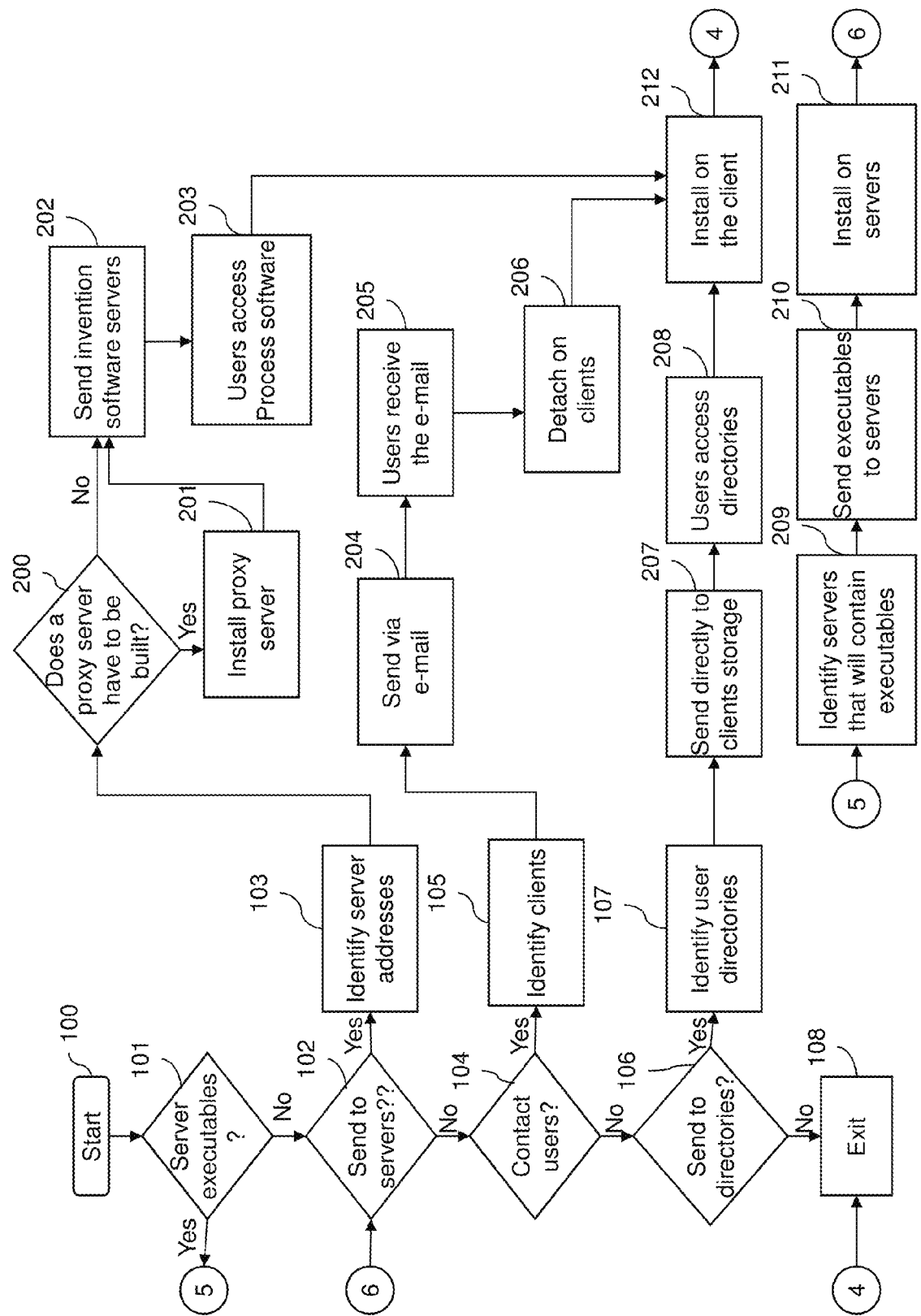
FIG. 8 is a schematic diagram of a deployment system according to embodiments herein.

In FIG. 8, Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying through the use of a shared file system 210. The process software is then installed on the servers 211.

Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail 204 to each of the users' client computers. The users then receive the e-mail 205 and then detach the process software from the e-mail to a directory on their client computers 206. The user executes the program that installs the process software on his client computer 212 then exits the process 108.

Lastly, a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 9:
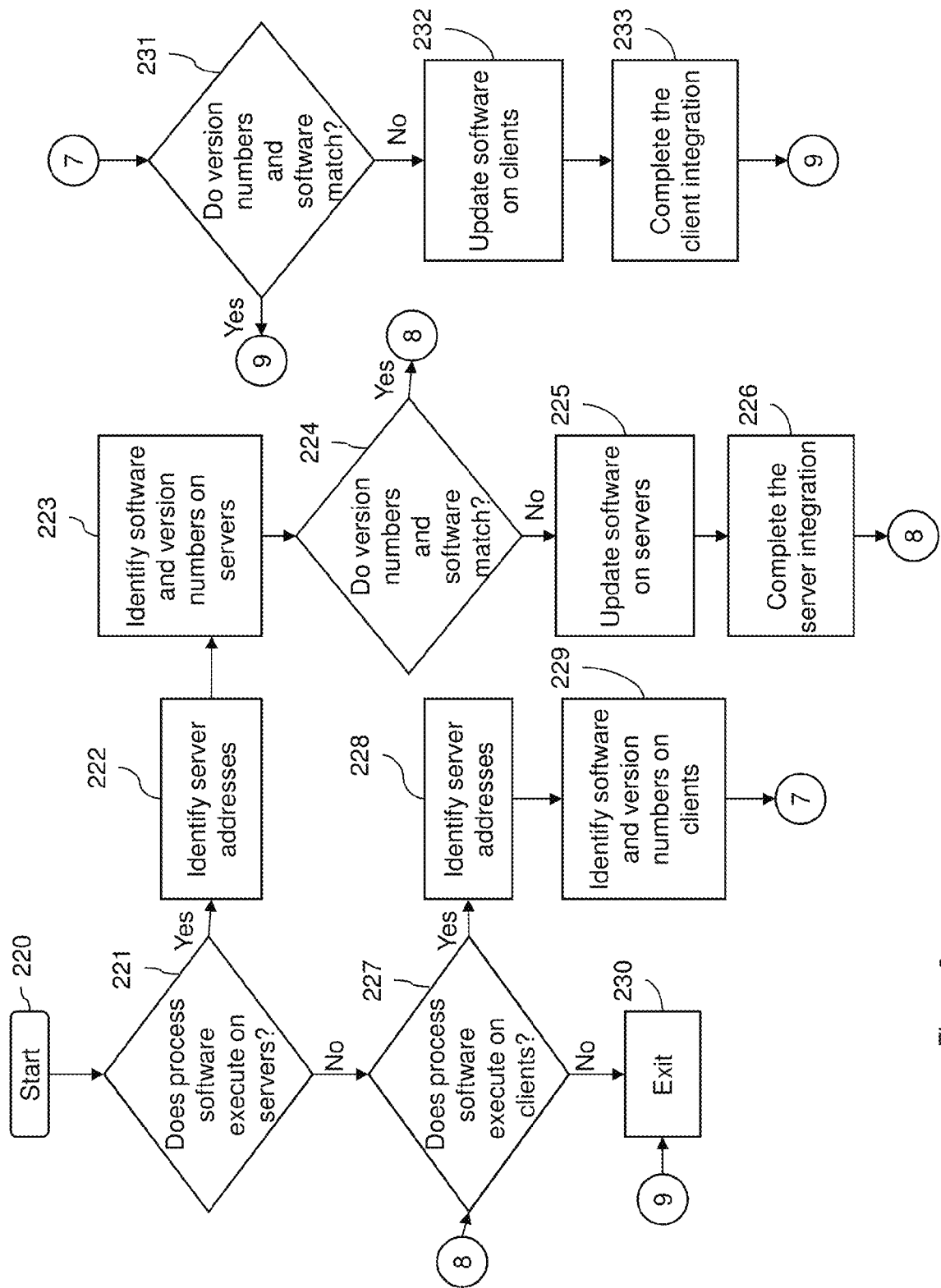
FIG. 9 is a schematic diagram of an integration system according to embodiments herein.

In FIG. 9, Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers, that have been tested with the process software 229.

The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization and it is scalable, providing capacity on demand in a payas- you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 10:
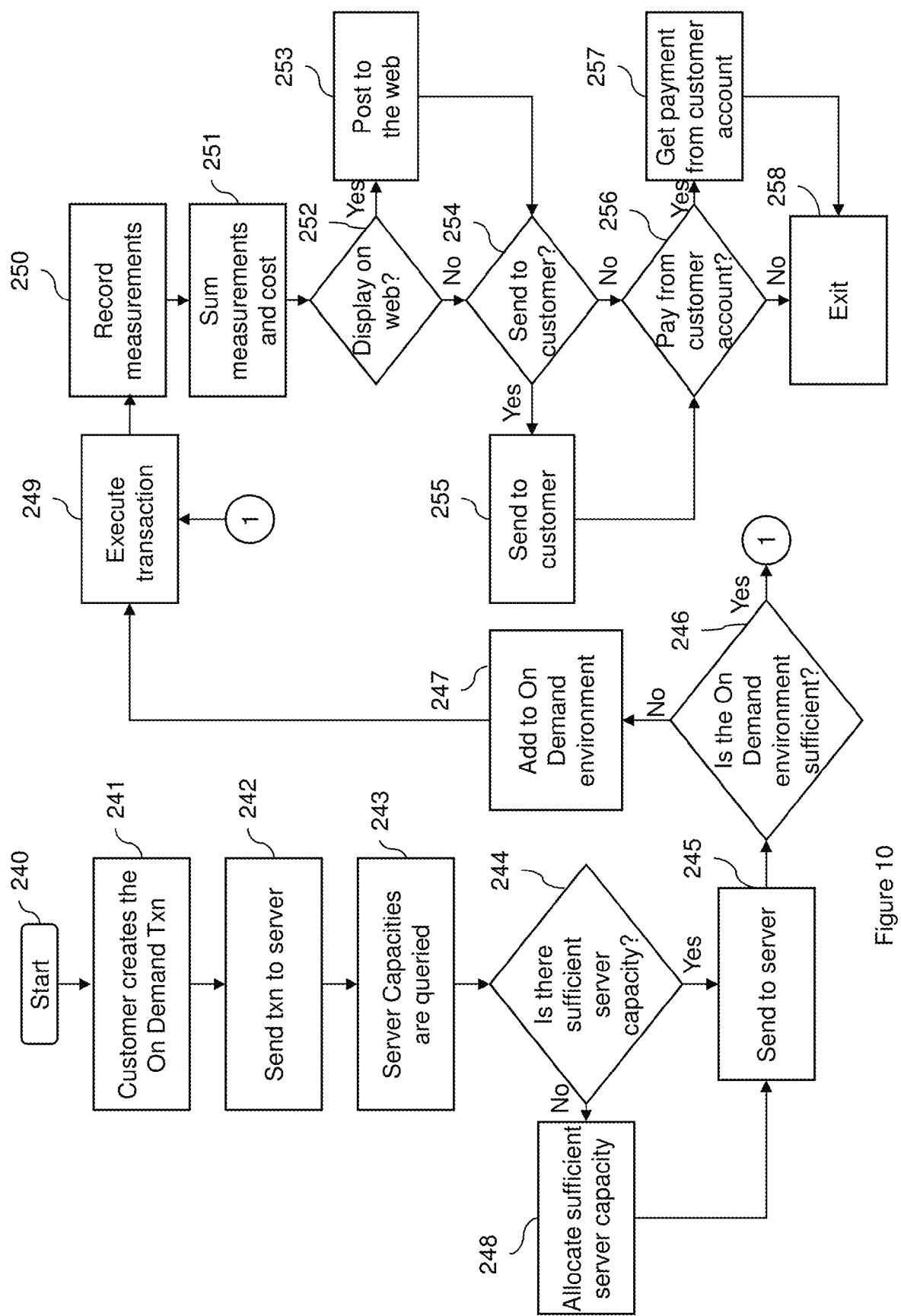
FIG. 10 is a schematic diagram of an on demand system according to embodiments herein.

In FIG. 10, Step 240 begins the On Demand process. A transaction is created than contains the unique customer identification, the requested service type and any service parameters that further specify the type of service 241. The transaction is then sent to the main server 242. In an On Demand environment the main server can initially be the only server, then as capacity is consumed other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next the required software to process the transaction is accessed, loaded into memory, then the transaction is executed 249.

The usage measurements are recorded 250. The usage measurements consists of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is to exit the On Demand process 258.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called tunnel interfaces, where the packet enters and exits the network.

Figure 11:
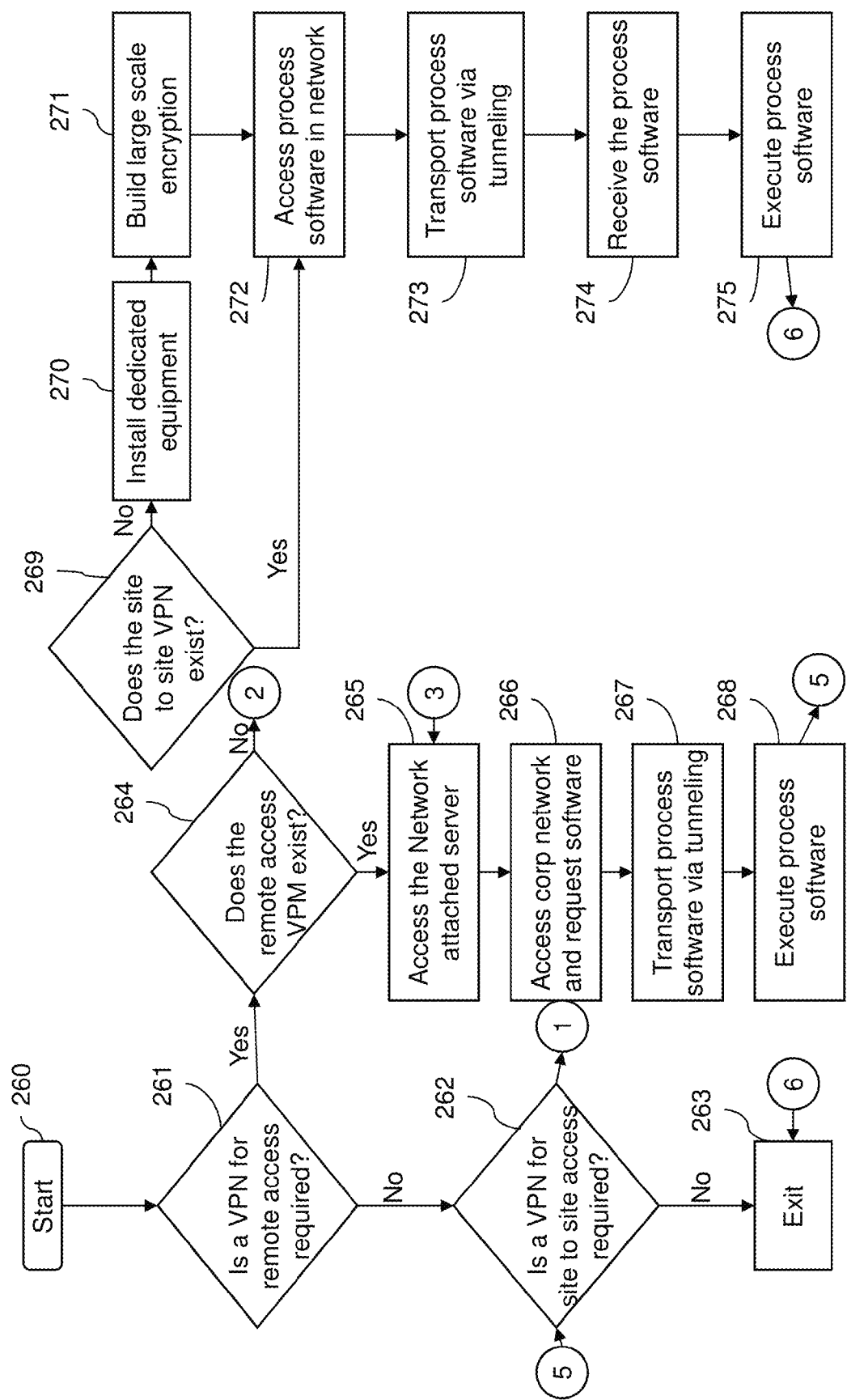
FIG. 11 is a schematic diagram of a virtual private network system according to embodiments herein.
Figure 12:
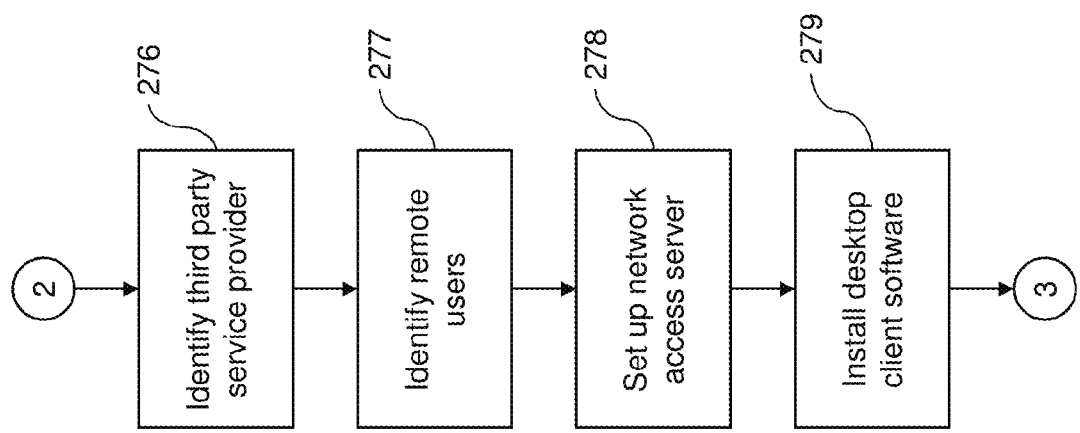
FIG. 12 is a schematic diagram of a virtual private network system according to embodiments herein.

In FIGS. 11 and 12, Step 260 begins the Virtual Private Network (VPN) process. A determination is made to see if a VPN for remote access is required 261. If it is not required, then proceed to 262. If it is required, then determine if the remote access VPN exists 264.

If it does exist, then proceed to 265. Otherwise identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built or if it been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271.

After the site to site VPN has been built or if it had been previously established, the users access the process software via the VPN 272. The process software is transported to the site users over the network via tunneling 273. That is the process software is divided into packets and each packet including the data and protocol is placed within another packet 274. When the process software arrives at the remote user's desktop, it is removed from the packets, reconstituted and is executed on the site users desktop 275. Proceed to exit the process 263.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   automatically collecting training data from manually created semantic relations using at least one computerized device;
   automatically extracting rules from said training data to produce extracted rules using said computerized device, said extracting rules comprising automatically removing noisy data from said semantic relations by filtering out ones of rules that do not occur in said training data;
   automatically characterizing existing semantic relations in said training data based on co-occurrence of said extracted rules in said existing semantic relations using said computerized device;

automatically constructing semantic relation topics based on said characterizing of said existing semantic relations using said computerized device; and grouping instances of said training data into said semantic relation topics to detect new semantic relations using said computerized device.

2. The method according to claim 1, further comprising removing redundant ones of said semantic relation topics using said computerized device.

3. The method according to claim 1, said semantic relation topics each comprising different concept levels.

4. The method according to claim 1, said characterizing of said existing semantic relations in said training data being based on a number of said extracted rules that are shared between corresponding ones of said existing semantic relations.

5. The method according to claim 1, said automatically removing noisy data from said semantic relations comprising:

automatically extracting popular argument types and keywords for each semantic relation, said popular argument types and keywords occurring above a previously established occurrence level in said training data;

automatically combining said popular argument types and keywords to create initial rules; and filtering out ones of said initial rules that do not occur in said training data to produce said extracted rules.

6. The method according to claim 1, each of said rules comprising relationships between two logical arguments, and each of said rules having components comprising argument1 type, argument2 type, noun, preposition and verb.

7. A method comprising:

automatically collecting training data from manually created semantic relations using at least one computerized device, said manually created semantic relations being based on explicit lexical and syntactic information;

automatically extracting rules from said training data to produce extracted rules using said computerized device;

automatically characterizing existing semantic relations in said training data based on co-occurrence of said extracted rules in said existing semantic relations using said computerized device;

automatically constructing semantic relation topics based on said characterizing of said existing semantic relations using said computerized device;

grouping instances of said training data into said semantic relation topics to detect new semantic relations using said computerized device, said new semantic relations being based on implicit lexical and syntactic information;

receiving at least one input question into said computerized device;

identifying ones of said new semantic relations that are present in said input question, to produce question semantic relations corresponding said input question using said computerized device;

matching said question semantic relations to data source semantic relations of at least one data source maintained is a separate device external to said computerized device to generate a plurality of candidate answers using said computerized device, said data source semantic relations comprising ones of said new semantic relations present in said data source;

calculating an answer score for each of said candidate answers based how closely said question semantic relations match said data source semantic relations using said computerized device; and ranking said candidate answers according to said answer score using said computerized device.

8. The method according to claim 7, further comprising removing redundant ones of said semantic relation topics using said computerized device.

9. The method according to claim 7, said semantic relation topics each comprising different concept levels.

10. The method according to claim 7, said characterizing of said existing semantic relations in said training data being based on a number of said extracted rules that are shared between corresponding ones of said existing semantic relations.

11. The method according to claim 7, further comprising automatically removing noisy data from said semantic relations in a process comprising:

automatically extracting popular argument types and keywords for each semantic relation, said popular argument types and keywords occurring above a previously established occurrence level in said training data;

automatically combining said popular argument types and keywords to create initial rules; and filtering out ones of said initial rules that do not occur in said training data to produce said extracted rules.

12. The method according to claim 7, each of said rules comprising relationships between two logical arguments, and each of said rules having components comprising argument1 type, argument2 type, noun, preposition and verb.

13. A system comprising:

a processor; and a non-transitory data storage device in communication with said processor, said non-transitory data storage device maintaining manually created semantic relations, said processor automatically collecting training data from said manually created semantic relations, said processor automatically extracting rules from said training data to produce extracted rules, said extracting rules comprising automatically removing noisy data from said semantic relations by filtering out ones of rules that do not occur in said training data, said processor automatically characterizing existing semantic relations in said training data based on co-occurrence of said extracted rules in said existing semantic relations, said processor automatically constructing semantic relation topics based on said characterizing of said existing semantic relations, and said processor grouping instances of said training data into said semantic relation topics to detect new semantic relations.

14. The system according to claim 13, said processor removing redundant ones of said semantic relation topics.

15. The system according to claim 13, said semantic relation topics each comprising different concept levels.

16. The system according to claim 13, said characterizing of said existing semantic relations in said training data being based on a number of said extracted rules that are shared between corresponding ones of said existing semantic relations.

17. The system according to claim 13, said processor automatically removing said noisy data from said semantic relations in a process comprising:

automatically extracting popular argument types and keywords for each semantic relation, said popular argument types and keywords occurring above a previously established occurrence level in said training data;

automatically combining said popular argument types and keywords to create initial rules; and filtering out ones of said initial rules that do not occur in said training data to produce said extracted rules.

18. The system according to claim 13, each of said rules comprising relationships between two logical arguments, and each of said rules having components comprising argument1 type, argument2 type, noun, preposition and verb.

19. A non-transitory computer readable storage medium readable by a computerized device, said non-transitory computer readable storage medium storing instructions executable by said computerized device to perform a method comprising:

method comprising:
- automatically collecting training data from manually created semantic relations;
- automatically extracting rules from said training data to produce extracted rules, said extracting rules comprising automatically removing noisy data from said semantic relations by filtering out ones of rules that do not occur in said training data;
- automatically characterizing existing semantic relations in said training data based on co-occurrence of said extracted rules in said existing semantic relations;
- automatically constructing semantic relation topics based on said characterizing of said existing semantic relations; and
- grouping instances of said training data into said semantic relation topics to detect new semantic relations.

20. The non-transitory computer readable storage medium according to claim 19, said method further comprising removing redundant ones of said semantic relation topics.

21. The non-transitory computer readable storage medium according to claim 19, said semantic relation topics each comprising different concept levels.

22. The non-transitory computer readable storage medium according to claim 19, said characterizing of said existing semantic relations in said training data being based on a number of said extracted rules that are shared between corresponding ones of said existing semantic relations.

23. The non-transitory computer readable storage medium according to claim 19, said automatically removing noisy data comprising:
- automatically extracting popular argument types and keywords for each semantic relation, said popular argument types and keywords occurring above a previously established occurrence level in said training data;
- automatically combining said popular argument types and keywords to create initial rules; and
- filtering out ones of said initial rules that do not occur in said training data to produce said extracted rules.

24. The non-transitory computer readable storage medium according to claim 19, each of said rules comprising relationships between two logical arguments, and each of said rules having components comprising argument1 type, argument2 type, noun, preposition and verb.

* * * * *